(12) United States Patent
Sakamoto

(10) Patent No.: US 6,842,510 B2
(45) Date of Patent: Jan. 11, 2005

(54) METHOD OF AND APPARATUS FOR CONTROLLING DEVICES

(75) Inventor: Mariko Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 10/261,596

(22) Filed: Oct. 2, 2002

(65) Prior Publication Data

US 2003/0185358 A1 Oct. 2, 2003

(30) Foreign Application Priority Data

Mar. 28, 2002 (JP) ......................................... 2002-093164

(51) Int. Cl.$^7$ .............................................. H04M 11/00
(52) U.S. Cl. .............................. 379/102.01; 379/88.02; 381/110; 704/275
(58) Field of Search ........................ 379/102.01–102.07, 379/88.01, 88.02; 704/275, 273, 270; 341/176, 173; 381/105, 110

(56) References Cited

U.S. PATENT DOCUMENTS 4,534,056 A    8/1985    Feilchenfeld et al.
4,918,615 A    4/1990    Suzuki et al.

FOREIGN PATENT DOCUMENTS

WO    WO 00/39789    7/2000
WO    WO 01/56019    8/2001

*Primary Examiner*—Wing F Chan
(74) *Attorney, Agent, or Firm*—Staas & Halsey LLP

(57) ABSTRACT

A command detector detects a control command based on voice input through a telephone or a door phone or the like, and a user and control command identifying section identifies the user and the control command. A command controller decides execution of the control command based on a comparison between a security level set to the control command and to an authority level and a priority level set to the user.

18 Claims, 11 Drawing Sheets

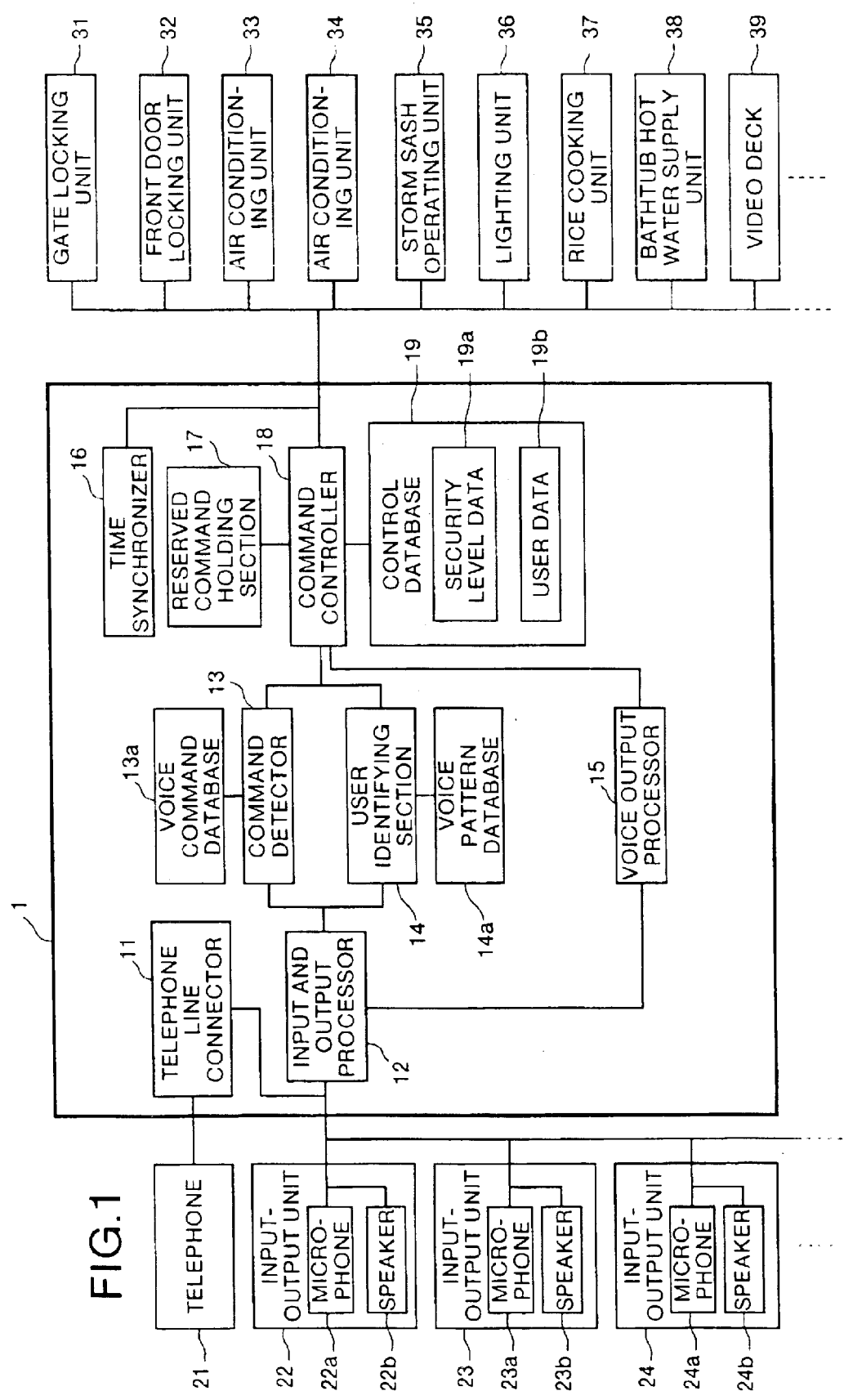

| CONTROL COMMAND | SECURITY LEVEL | NECESSARY AUTHORITY LEVEL |
|---|---|---|
| RICE COOKING | 4 | |
| ROOM 1 AIR CONDITIONING OPERATION (INSTANT) | 5 | |
| ROOM 1 AIR CONDITIONING OPERATION (RESERVED) | 3 | B |
| ROOM 2 AIR CONDITIONING OPERATION (INSTANT) | 5 | |
| ROOM 2 AIR CONDITIONING OPERATION (RESERVED) | 3 | B |
| FRONT DOOR LOCKING | 3 | C |
| FRONT DOOR UNLOCKING | 3 | B |
| GATE LOCKING (INSTANT) | 3 | C |
| GATE LOCKING (RESERVED) | 1 | A |
| GATE UNLOCKING (INSTANT) | 3 | C |
| GATE UNLOCKING (RESERVED) | 1 | A |
| STORM SASH OPERATION (INSTANT) | 3 | B |
| STORM SASH OPERATION (RESERVED) | 2 | B |
| ILLUMINATION OPERATION (INSTANT) | 5 | |
| ILLUMINATION OPERATION (RESERVED) | 2 | B |
| HOT-WATER SUPPLY TO BATHTUB (INSTANT) | 3 | B |
| HOT-WATER SUPPLY TO BATHTUB (RESERVED) | 3 | B |
| HOT WATER SUPPLY UNIT | 5 | |
| ⋮ | ⋮ | ⋮ |

FIG.3

| USER | AUTHORITY LEVEL | PRIORITY LEVEL |
|---|---|---|
| USER a | A | 1 |
| USER b | A | 2 |
| USER c | B | 3 |
| USER d | C | 3 |
| ⋮ | ⋮ | ⋮ |

RESERVED COMMAND LIST 2002.5.5   17a

| TIME | CONTROL COMMAND | PRIORITY LEVEL |
|---|---|---|
| 11:30 | START RICE COOKING | 1 |
| 11:50 | ROOM 1  START AIR CONDITIONING  20°C | 2 |
| 13:00~15:00 | EXECUTE VIDEO RECORDING 2CH | 3 |
| 18:00 | CLOSE STORM SASH | 1 |
| 19:00 | ROOM 1  START AIR CONDITIONING  20°C,<br>ROOM 2  START AIR CONDITIONING  20°C | 2 |
| 20:00 | SUPPLY HOT WATER TO BATHTUB | 1 |

FIG.7

| CONTROL COMMAND | POSITION | SECURITY LEVEL | NECESSARY AUTHORITY LEVEL |
|---|---|---|---|
| RICE COOKING | WITHIN HOUSE | 4 | |
| | OTHERS | 3 | B |
| ROOM 1 AIR CONDITIONING OPERATION (INSTANT) | ROOM 1 | 5 | |
| | OTHERS | 3 | B |
| ROOM 1 AIR CONDITIONING OPERATION (RESERVED) | ALL | 3 | B |
| ROOM 2 AIR CONDITIONING OPERATION (INSTANT) | ROOM 2 | 5 | |
| | OTHERS | 3 | B |
| ROOM 1 AIR CONDITIONING OPERATION (RESERVED) | ALL | 3 | B |
| FRONT DOOR LOCKING OPERATION | ALL | 3 | C |
| FRONT DOOR UNLOCKING OPERATION | WITHIN HOUSE | 3 | B |
| | OTHERS | 1 | A |
| HOT WATER SUPPLY UNIT | ALL | 5 | |
| ⋮ | ⋮ | ⋮ | ⋮ |

| DAY OF THE WEEK | TIME | CONTROL COMMAND | |
|---|---|---|---|
| EVERYDAY | 6 : 00 | ROOM 1 START AIR CONDITIONING | 20°C |
| WEEKDAY | 9 : 00 | ROOM 1 END AIR CONDITIONING | |
| WEEKDAY | 16 : 00~17 : 00 | EXECUTE VIDEO RECORDING | 4ch |
| EVERYDAY | 20 : 00 | ROOM 1 START AIR CONDITIONING | 20°C |
| WEEKDAY | 20 : 00 | COOK RICE | |
| HOLIDAY | 18 : 00 | COOK RICE | |
| ⋮ | ⋮ | ⋮ | ⋮ |

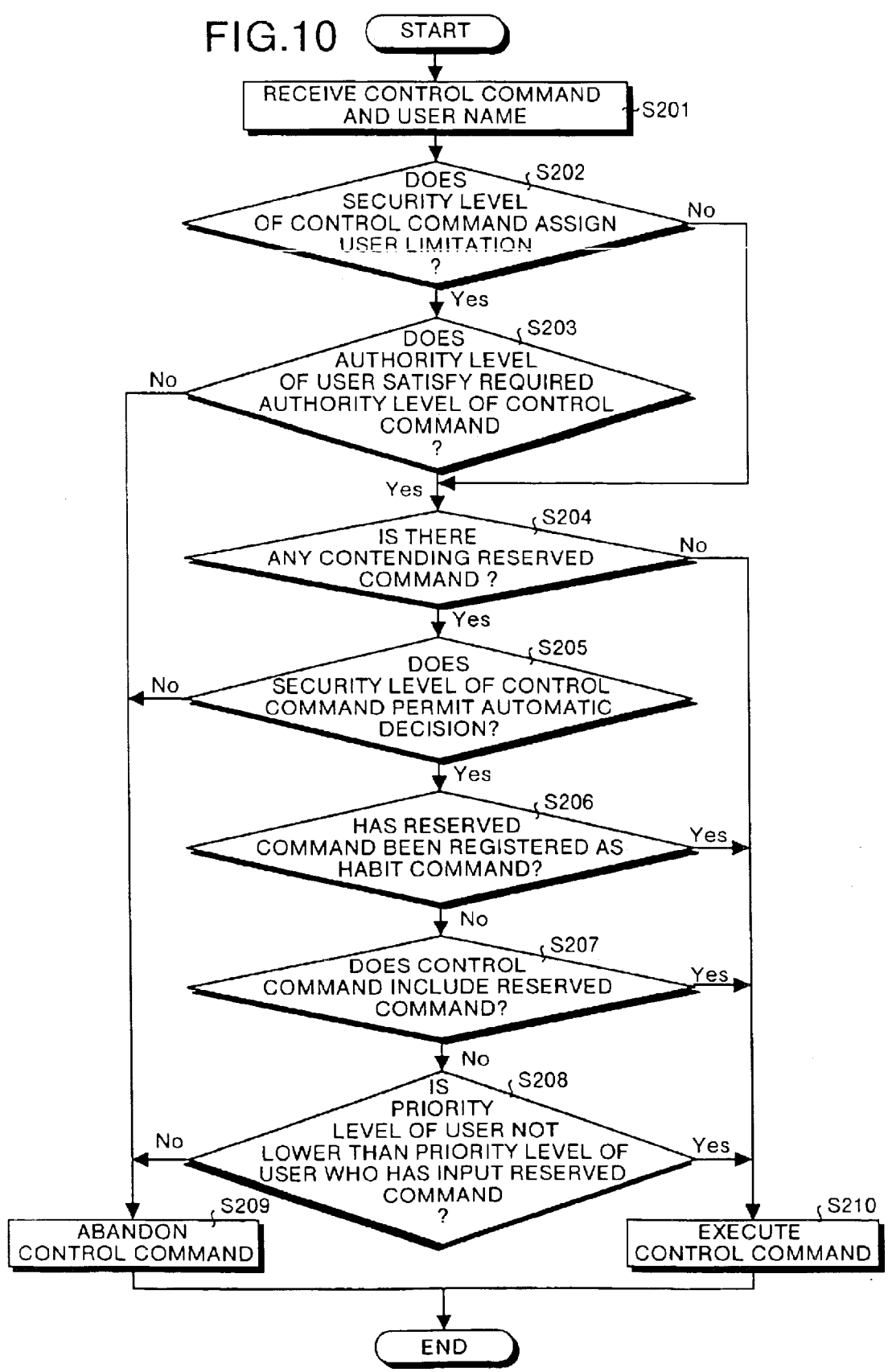

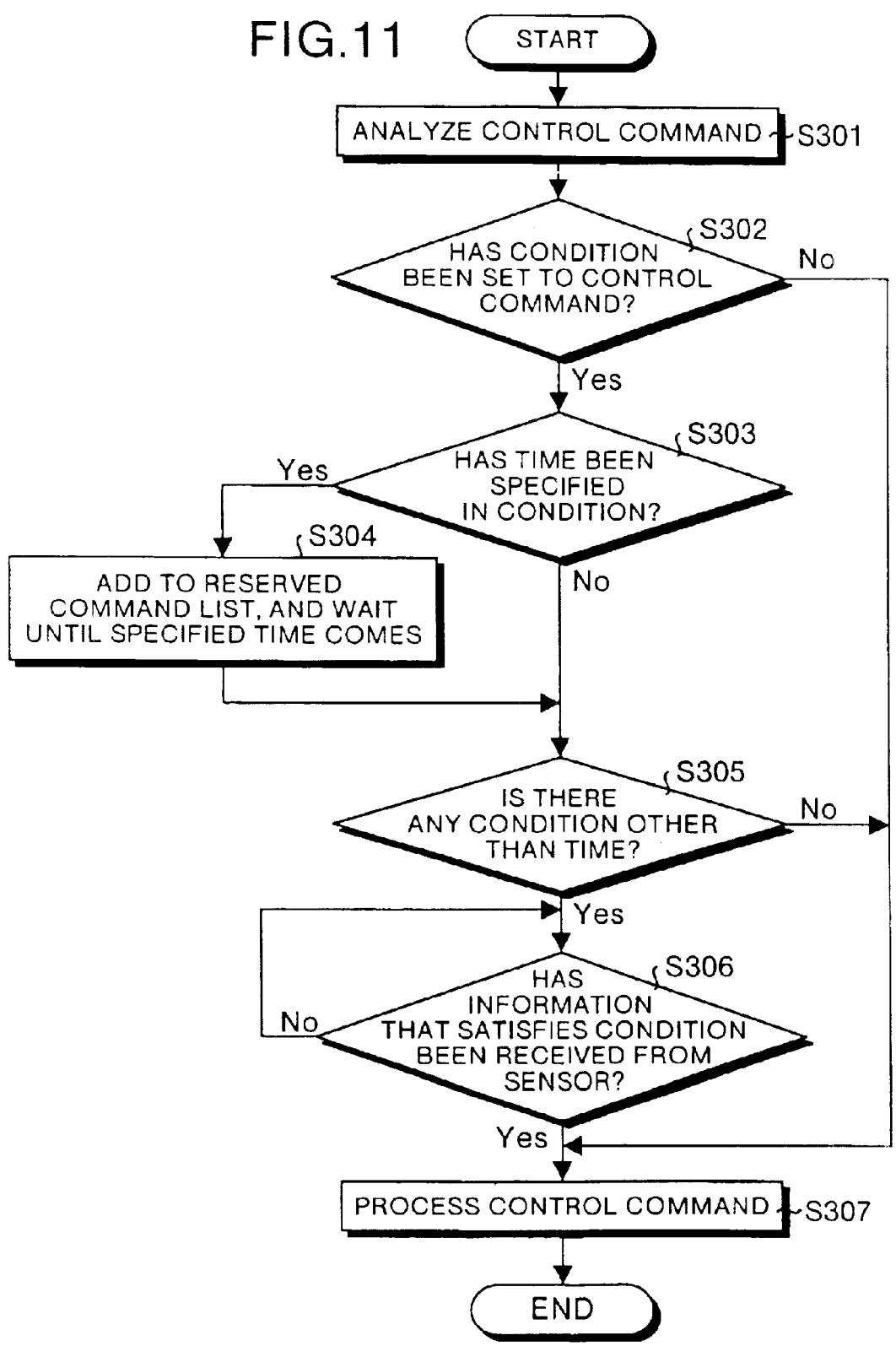

METHOD OF AND APPARATUS FOR CONTROLLING DEVICES

BACKGROUND OF THE INVENTION

1) Field of the Invention

The present invention relates to a technology for controlling different devices based on voice.

2) Description of the Related Art

In recent years, various devices have been introduced into houses and offices. These devices operate based on their respective own interfaces. Further, these devices have increased functions according to the needs of users, which causes the trend of the functions toward more advanced and more multiple.

However, there is a tendency that the user interface becomes complex as the functions of the devices are being more advanced and multiple. In order to manage the complex interface, it is necessary to carefully read a manual of the interface, understand how to use the interface, and remember the method. In other words, in order to manage the complex devices, users need to make effort. Depending on users, they cannot utilize the devices. Further, depending on users, they do not intend to read the whole manual whose amount increases along the increase in functions. They tend to extract only functions considered necessary and refer to only corresponding portions of the manual, and therefore the functions may be insufficiently utilized even though these functions are useful for these users.

In order to control each device, the user needs to move to each position. Along the increase in the sophistication of devices in recent years, a reservation function is provided in various kinds of devices such as a video deck, a rice cooker, or an air conditioner. It is however required for the user to set the reservation function at each position of the device.

As each device operates independently, it is not possible to operate a plurality of devices by linking them to each other. For example, if rice cooking, air conditioning, and hot water supply to a bathtub are started to operate at respective predetermined times before the user gets home, the user is required to set a reservation function to each device separately.

Taking the situation above into consideration, it is desirable to integrally control the plurality of devices introduced in houses and offices, and the control can be instructed in voice or the like. Further, it is ideal that the devices are controlled using a sentence at a daily conversation level instead of a sentence fixed in advance. Further, in integrally controlling the devices in voice or the like, it is necessary to decide whether a user instruction is to be executed or not from the viewpoint of security and protection against disasters. Further, when contradictory requests have been issued from a plurality of users, it is necessary to decide the requests flexibly and automatically according to situations.

SUMMARY OF THE INVENTION

It is an object of this invention to provide a device control apparatus and a device control method capable of integrally controlling a plurality of devices, flexibly responding to a voice instruction according to situations, and automatically deciding whether mutually contradictory control commands input from a plurality of users can be executed.

This invention provides the device control apparatus and device control method. The device control apparatus controls operation of a device based on a control command extracted from voice of a user. The device control apparatus comprises an authority level storing unit that stores user identifiers of the users and authority level of each user in correlated form, a security level storing unit that stores a plurality of security levels and a plurality of control commands in correlated form, a user and command identifying unit that identifies a user and the control command based on voice recognition, and a command controller that controls transmission of the control command to the device based on a comparison between the authority level of the identified user and the security level of the identified control command.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 1 is a diagram for explaining an outline structure of a device control apparatus according to a first embodiment, FIG. 2 is a diagram for explaining security level data that is held in a control database 19, FIG. 3 is a diagram for explaining user data that is held in the control database 19, FIG. 4 is a diagram for explaining one example of a reserved command list, FIG. 7 is a diagram for explaining a security data 19c held in the security database 19, FIG. 9 is a diagram for explaining one example of habit commands that are registered in a habit data 19e, FIG. 10 is a flowchart for explaining the processing operation of a command controller 53 based on the habit commands, and FIG. 11 is a flowchart for explaining the processing operation of the command controller 53 based on sensor information.

DETAILED DESCRIPTION

Figure 5:
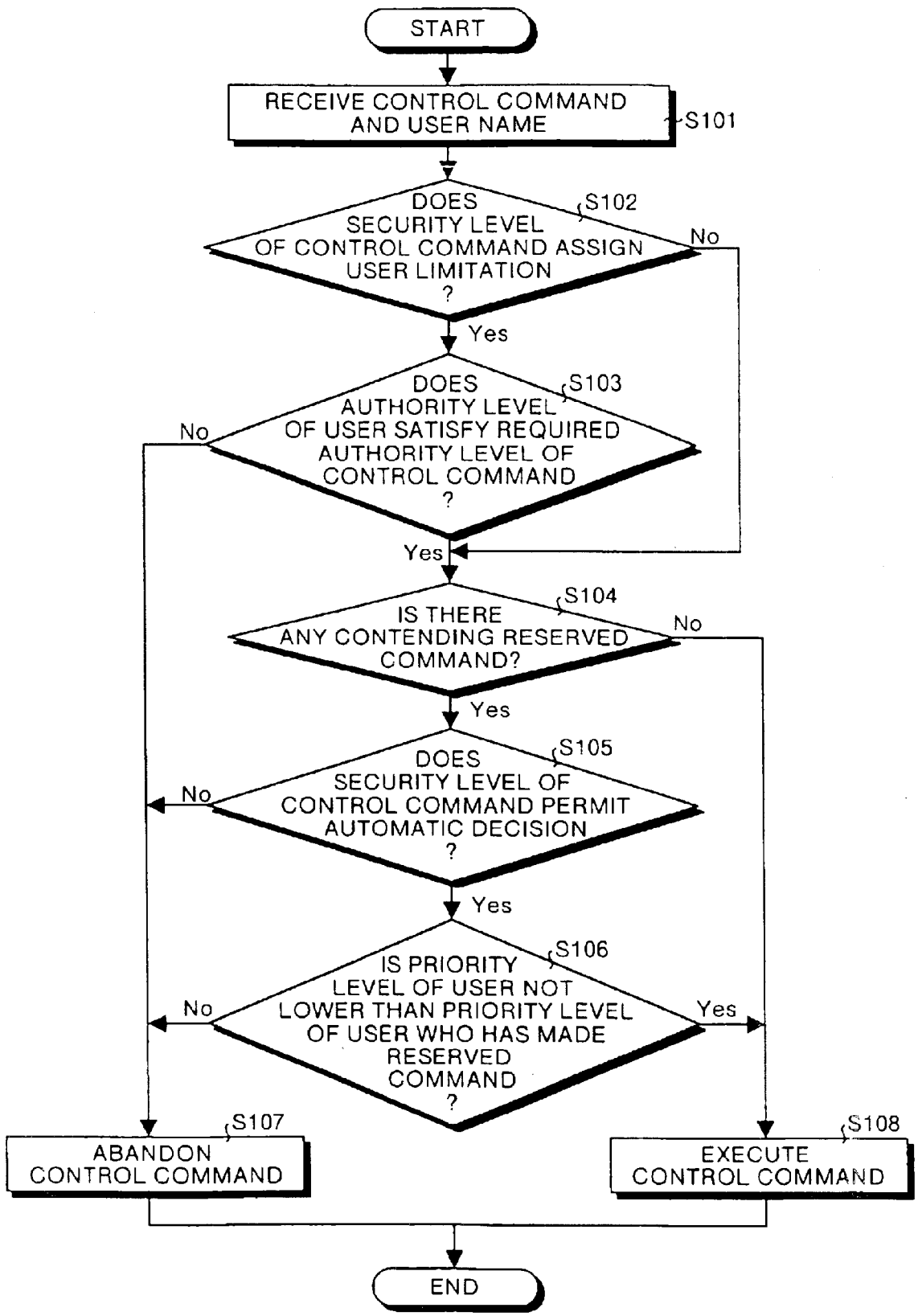
FIG. 5 is a flowchart for explaining the operation of a command controller 18 shown in FIG. 1.

Embodiments of the device control apparatus and the device control method according to this invention will be explained in detail below with reference to the attached drawings. In a first embodiment, a device control apparatus will be explained as follows. The device control apparatus identifies a user based on input voice data, and controls the operation of a device based on an authority level and a priority level that have been set to the user and a security level that has been set to a control command. In a second embodiment, a device control apparatus will be explained as follows. The device control apparatus changes a security level based on an input position of sound data. Further, in a third embodiment, a device control apparatus will be explained as follows. The device control apparatus controls the operation of a device by using a reception history of the control command and information that has been output from an external sensor.

An outline structure of the device control apparatus according to the first embodiment will first be explained. FIG. 1 is a diagram for explaining the outline structure of the device control apparatus according to the first embodiment. In this figure, a device control apparatus 1 is connected to a telephone 21 and input-output units 22 to 24, and operates a gate locking unit 31, a front door locking unit 32, air conditioning units 33 and 34, a storm sash operating unit 35, a lighting unit 36, a rice cooking unit 37, a bathtub hot water supply unit 38, a video deck 39, etc., based on voice data received from the telephone 21 and the input-output units 22 to 24.

The input-output unit 22 is internally provided with a microphone 22a and a speaker 22b. The microphone 22a outputs user's voice as voice data to an input-output processor 12 inside the device control apparatus 1, and the speaker 22b outputs voice data output from the input-output processor 12 to a user. Similarly, the input-output units 23 and 24 have microphones 23a and 24a and speakers 23b and 24b respectively, and input and output voice data to and from the input-output processor 12. The input-output units 22 to 24 are installed at positions where users are considered to carry out control of devices in voice, within a house or an office. For example, when they are installed within a house, they are provided at a front door, at a kitchen, and in each room respectively. Further, a telephone line connector 11 provided inside the device control apparatus 1 connects the telephone 21 with the input-output processor 12 via a telephone line, and enables the user to control the devices based on a telephone call.

The input-output processor 12 outputs voice data received from the telephone 21 and the input-output units 22 to 24, to a command detector 13 and a user identifying section 14. The command detector 13 detects a control command contained in the voice data by referring to a voice command database 13a, and outputs the control command to a command controller 18. The voice command database 13a relates a plurality of voice data to the control command, and makes it possible to flexibly respond to data by voice that has been input by the user. The user identifying section 14 identifies a user from voice of the user by referring to a voice pattern database 14a, and outputs a result to the command controller 18.

The command controller 18 obtains a security level of the control command and an authority level and a priority level of the user, by referring to a control database 19, based on the control command detected by the command detector 13 and the user identified by the user identifying section. The command controller 18 determines whether the control command is to be transmitted or not, based on the security level of the control command and the authority level and the priority level of the user. When the control command is to be transmitted, the command controller 18 selects a corresponding device, and transmits the control command to the device, thereby to control the operation. In FIG. 1, the gate locking unit 31, the front door locking unit 32, the air conditioning units 33 and 34, the storm sash operating unit 35, the lighting unit 36, the rice cooking unit 37, the bathtub hot water supply unit 38, and the video deck 39 are connected to the device control apparatus 1, and their operation are controlled.

When a control command with a time specified has been received, the command controller 18 decides transmission of the control command, and then registers the control command as a reserved command into a reserved command holding section 17. This reserved command holding section 17 holds the reserved command until the specified time comes, and transmits the control command at the specified time. When the air conditioning units 33 and 34 and the rice cooking unit 37 have their own reservation functions, the command controller 18 directly transmits the control commands each with a time specified, to these devices, and controls their operation by using the reservation functions of these devices. At this time, the command controller 18 registers the transmitted control commands as reserved commands into the reserved command holding section 17 at the same time. In this case, the reserved command holding section 17 holds the reserved commands until their specified times come, and abandons the reserved commands thereafter. In other words, when the reservation function of each device is used, the reserved command holding section 17 functions as a database that manages the reservation status of each device.

Further, the command controller 18 is connected to a voice output processor 15. The voice output processor 15 converts information output to the user from the command controller 18, into voice data, and outputs the voice data to the telephone 21 and the input-output units 22 to 24. With this arrangement, the user can control the devices and confirm the information, based on a conversation with the device control apparatus 1.

Further, the device control apparatus 1 has a time synchronizer 16. The time synchronizer 16 transmits time information to devices that have a clock function among the connected devices, and synchronizes the time of these devices. By synchronizing the time of the devices, it is possible to prevent the occurrence of deviations in the command execution timing between the devices, at the time of transmitting the control command with a time specified.

A security level of a control command and an authority level and a priority level of a user will be explained below. FIG. 2 is a diagram for explaining security level data that is held in the control database 19, and FIG. 3 is a diagram for explaining user data that is held in the control database 19. In FIG. 2, each control command is set to any one of values from 1 to 5 as a security level. The security level is a value that shows a condition required when each control command is transmitted, and it is possible to optionally set a level number of the security level and conditions specified by each security level. In this case, security levels are set as five levels. Conditions shown by the security level 1 are set as "Only a request from a specific user is accepted. A decision is not made automatically. An alarm is issued to a contradictory instruction." Conditions shown by the security level 2 are set as "Only a request from a specific user is accepted. A decision is made automatically, and an approval is obtained." A condition shown by the security level 3 is set as "Only a request from a specific user is accepted." Conditions shown by the security level 4 are set as "Requests from all users are accepted. A decision is made automatically, and an approval is obtained." Conditions shown by the security level 5 are set as "Requests from all users are accepted. A decision is made automatically, and an approval is not obtained."

The control commands that have been set to the security levels 1 to 3 accept only a request from a specific user, and therefore, "a necessary authority level" is set to these control commands. For example, a control command that instructs a rice cooking has been set to the security level 4, and a control command that instructs an air conditioning operation without a time specified has been set to the security level 5. Therefore, a necessary authority level has not been set to these control commands. Consequently, all users can execute these control commands. On the other hand, a control command that instructs an air conditioning operation with a time specified, has been set to the security level 3. Therefore, a necessary authority level B has been set to this control command. A control command that instructs a locking or unlocking of the front door has been set to the security level 3, and an authority level that is necessary for the locking has been set to C, and an authority level that is necessary for the unlocking has been set to B. Further, a control command that instructs the locking of the gate has been set to the security level 3. A control command that reserves the locking of the gate has been set to the security level 1. An authority level that is necessary for the locking without a time specified has been set to C, and an authority level that is necessary for the reserving of the locking of the gate has been set to A.

A plurality of control commands corresponding to the air conditioning operation are available for a room 1 and a room 2. This is because respective air conditioning units are independently operated when the air conditioning unit 33 is installed in the room 1 and the air conditioning unit 34 is installed in the room 2. When a plurality of control commands are provided for the same device, for example, for locking and unlocking the gate or the front door, a security level and a necessary authority level are provided independently for each of the different control commands. This is because the importance is different in terms of the security between the locking and the unlocking of the gate or the front door. Further, for the same control command, a security level and a necessary authority level are provided independently for each of cases where the operation is reserved with a condition that specifies a time, and when the operation is carried out instantly without time specification.

A user data 19b shown in FIG. 3 holds settings of an authority level and a priority level of each user. This authority level is used to decide whether the user has the right to execute the control command, by comparing it with a necessary authority level that has been set corresponding to each control command. Further, the priority level is used to determine priority orders between users. When a control command input by a user who satisfies the necessary authority level is contradictory and contend with a different control command that is currently being executed by the device control apparatus 1 or a different control command that has been registered in the reserved command, this priority level is used to decide whether the control command is to be executed or not, by comparing priority levels of users who have input the control commands.

In FIG. 3, the user data 19b sets the authority level A and the priority level 1 to a user a, and sets the authority level A and the priority level 2 to a user b. Further, the user data 19b sets the authority level B and the priority level 3 to a user c, and sets the authority level C and the priority level 3 to a user d. In this explanation, there are four users from a to d, the authority levels are from A to C, and the priority levels are from 1 to 3. However, it is possible to optionally determine the number of users, the number of authority levels, and the number of priority levels.

Reserved commands held in the reserved command holding section 17 will be explained below. The reserved command holding section 17 holds a control command in correlation with a time at which a control is to be executed and the priority level of a user who has input the control command. FIG. 4 is a diagram for explaining one example of a reserved command list. In FIG. 4, a reserved command list 17 stores the following commands as reserved commands. That is, the reserved commands are "Start rice cooking at eleven o'clock (priority level 1)", "Start air conditioning of the room 1 at eleven fifty and set to 20° C. (priority level 2)", "Record channel 2 on a video tape from thirteen o'clock to fifteen o'clock (priority level 3)", "Close the storm sashes at eighteen o'clock (priority level 1)", "Start air conditioning of the room 1 at nineteen o'clock and set to 20° C. (priority level 2)", "Start air conditioning of the room 2 at nineteen o'clock and set to 20° C. (priority level 2)", and "Supply hot water to the bathtub at twenty o'clock (priority level 1)".

The reserved command holding section 17 refers to the reserved command list as needed, and transmits a control command to a corresponding device when a specified time has come. When a new control command has been received, the command controller 18 refers to the reserved command list, and confirms presence or absence of a contending reserved command. Further, when a contending reserved command exists, the command controller 18 compares a priority level of a user who has input the new control command with a priority level of the reserved command. When the priority level of the user who has input the new control command is lower than the priority level of the reserved command, the command controller 18 abandons the newly received control command. In the above example, the reserved command list for one day has been explained. However, the reserved command may specify a date and time, or specify for every day or a predetermined day of the week for repeated execution.

When a user has requested a confirmation of reserved information, the reserved command holding section 17 outputs the reserved command list to the user. The reserved command list may be output in voice by reading, or by telephone, or may be displayed on a display screen by providing this screen on the input-output unit.

The operation of the command controller 18 will be explained in further detail with reference to a flowchart shown in FIG. 5. In FIG. 5, the command controller 18 first receives a control command from the command controller 13, and receives a user who has input the control command through the user identifying section 14 (step S101). Next, the command controller 18 obtains a security level of the control command received from the control database 19, and decides whether the security level assigns a user limitation, that is, whether the security level is any one of 1 to 3 or not (step S102). When the security level assigns a user limitation, that is, when the security level is any one of 1 to 3 (Yes at step S102), the command controller 18 decides whether the authority level of the user satisfies a required authority level of the command or not (step S103). When the authority level of the user does not satisfy the required authority level of the control command (No at step S103), the command controller 18 abandons the received control command (step S107), and ends the processing.

When the security level of the received control command does not assign a user limitation, that is, when the security level is 4 or 5 (No at step S102), and also when the authority level of the user satisfies a required authority level of the command (Yes at step S103), the command controller 18 refers to the reserved command holding section 17, and decides whether there exists any reserved command that contends with the received control command or not (step S104) When a contending reserved command does not exist (No at step S104), the command controller 18 executes the received control command (step S108), and ends the processing.

When a contending reserved command exists (Yes at step S104),the command controller 18 decides whether the security level of the control command permits an automatic decision or not, that is, whether the security level is any one of 2 to 5 or not (step S105). When the security level of the control command does not permit the automatic decision, that is, when the security level is 1 (No at step S105),the command controller 18 abandons the received control command (step S107), and ends the processing. When the security level of the control command permits the automatic decision, that is, when the security level is any one of 2 to 5 (Yes at step S105), the command controller 18 decides whether the priority level of the user who has input the control command is not lower than the priority level of the reserved command or not (step S106). When the priority level of the user who has input the control command is lower than the priority level of the user who has input the reserved command (No at step S106), the command controller 18 abandons the received control command (step S107), and ends the processing. When the priority level of the user who has input the control command is not lower than the priority level of the user who has input the reserved command (Yes at step S106), the command controller 18 executes the control command (step S108), and ends the processing.

The execution of a control command at step S108 will be explained below. When a control command to be executed needs an approval, that is, when the security level is 2 or 4, the command controller 18 uses the voice output processor 15 to output a confirmation message to the user. When a user's approval has been obtained, the command controller 18 executes the control command. When the user's approval has not been obtained, the command controller 18 abandons the control command. A control command is transmitted to a corresponding device when there is no time specification in the control command. However, when there is a time specification in a control command and a corresponding device does not have an own reservation function, the control command is registered as a reserved command into the reserved command holding section 17. When there is time specification in a control command and a corresponding device has an own reservation function, the contents shown by the control command is reserved and registered into the reserved command holding section 17 by utilizing the reservation function of the corresponding device.

As described above, in the first embodiment, a user is identified and a control command is detected from voice data that has been input by the user. The device control apparatus 1 decides execution of the control command based on a security level set to the control command and also to an authority level and a priority level set to the user. Therefore, it is possible to integrally control a plurality of devices, flexibly respond to a voice instruction according to situations, and automatically decide execution of mutually contradictory control commands input from a plurality of users.

For example, when this device control apparatus is used in the house, it is possible to prevent unnecessary operation of devices due to the voice of children, by setting a high authority level and a high priority level to parents and setting a low authority level and a low priority level to the children. Further, it is possible to set a higher priority to the parents than the children of control of the device. Further, as the voice command database 13a relates a plurality of voice data to one control command, a user can control the devices based on the expression at the normal conversation level.

For example, an air conditioner that warms or cools a room is generally called "an air-con" in Japan. Further, an air conditioner that only cools a room is generally called "a cooler". However, when we say "turn on the cooler" in the house, the cooler often indicates the cooling function of an air conditioner what is called the "air-con" that has both the cooling and heating functions. In ordinary conversations, the same device is often called under different names, as explained above. When a plurality of voice data such as "a cooler", "an air-con" and "a heater" are related to the control command that controls the air conditioner, the user can control the device using an optional expression. Further, a user may give different names to a room, depending on how to use the room. For example, when the room 1 and the room 2 are related to voice data of "a living room" and "a bedroom" respectively, the user can specify the rooms in optional expressions.

In the device control apparatus shown in this first embodiment, security levels of the same control command are differentiated between when a reservation is made by specifying a time and when a control is carried out instantly without time specification. Therefore, when the children want to change the room temperature after the parents have reserved the air conditioner of the same room in advance, for example, the children having a lower priority level can change the room temperature, by placing a high priority to the instant control.

As explained above, it is possible to obtain the device control apparatus and the device control method capable of flexibly responding to situations, by setting a security level, an authority level, and a priority level to optional values, and controlling devices at the daily conversation level.

The device control apparatus that controls devices only by the voice of a user has been explained above. However, a user interface is not limited to voice, and it is also possible to use the interface by combining it with an interface of a keyboard or a portable terminal. Further, when a control command is input by voice and a reserved command is confirmed, it is also possible to display a list on a display.

Although the use of this invention within a house has been mainly explained above, the utilization of this invention is not limited to within the house, and it is also possible to use the invention in a wide area when a plurality of devices are collectively controlled.

In the second embodiment, a device control apparatus and a device control method wherein the device control apparatus explained in the first embodiment further has a function of changing a security level based on an input position of voice data will be explained.

Figure 6:
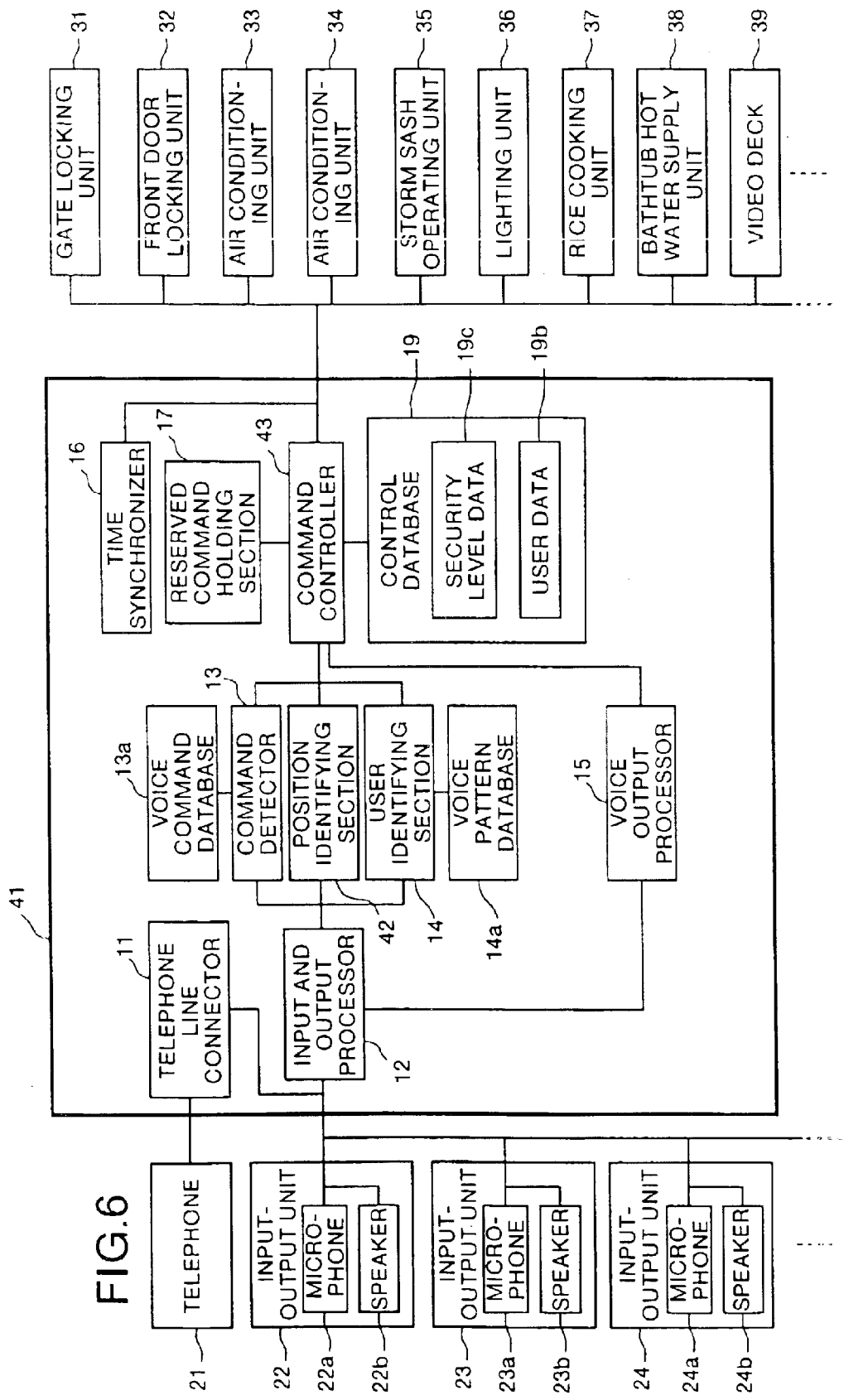
FIG. 6 is a diagram for explaining an outline structure of a device control apparatus 41 according to a second embodiment.

FIG. 6 is a diagram for explaining an outline structure of a device control apparatus 41 according to the second embodiment. In FIG. 6, the device control apparatus 41 inputs voice data output from the input-output processor 12, to a position identifying section 42 in addition to the command detector 13 and the user identifying section 14. A command controller 43 decides whether a control command is allowed to be executed or not, based on the control command detected by the command detector 13, a user identified by the user identifying section 14, and an input position of voice identified by the position identifying section 42. A security level data 19c that is held in the control database 19 has security levels differently set to control commands depending on positions to which the control commands are input. Other structures are similar to those of the device control apparatus 1 shown in the first embodiment. The same reference numerals are assigned to the identical constituent elements, and detailed explanation of the elements will be omitted.

The position identifying section 42 identifies a position at which the user has input voice, based on voice data that has been output from the input-output processor 12 and outputs the identified position to the command controller 43. It is possible to decide the position by detecting which one of the telephone 1 and the input-output units 22 to 24 the user has used to input the voice. The command controller 43 obtains a security level and a necessary authority level of the control command from the control database 19, based on the position identified by the position identifying section 42 and the control command detected by the command detector 13, and decides whether the control command is allowed to be executed based on a comparison between the levels and the authority level and the priority level of the user identified by the user identifying section 14.

FIG. 7 is a diagram for explaining the security data 19c held in the security database 19. As shown in FIG. 7, the security level data 19c sets a security level to each control command at each position. When the security level has assigned a user limitation, that is, when the security level is one of the security levels 1 to 3, an authority level of the user that is necessary to execute the control command has been set as a required authority level. For example, the control command "rice cooking" has its security level set to 4 when the control is carried out through the input-output unit installed within the house. This control command "rice cooking" has its security level set to 3 when the control is carried out by telephone from the outside of the house, and the necessary authority level has been set to B in this case.

A control command to carry out the air conditioning operation of the room 1 without time specification has its security level set to 5 when the control is carried out from the room 1. This control command has its security level set to 3 when the control is carried out from other positions, and the necessary authority level has been set to B in this case. On the other hand, a control command to carry out the air conditioning operation of the room 1 with a time specified, has its security level set to 3 regardless of a voice input position, and the necessary authority level has been set to B. Further, a control command to carry out the unlocking of the front door has its security level set to 3 when the control is carried out from within the house, and the necessary authority level has been set to B. This control command has its security level set to 1 when the control is carried out from other positions, and the necessary authority level has been set to A.

As explained above, by changing the security level and the authority level for the same control command corresponding to a position at which the user has input the control command, it is possible to control the devices more flexibly. For example, there is a case where the front door is to be unlocked. In this case, unlocking in order to go out of the house is largely different from unlocking in order to enter the house in terms of security, although the action of "unlocking" is the same. The action of locking is for preventing an invader from the outside but not for preventing a person from going out of the house. On the other hand, when an infant is in the house, it is necessary to prevent this infant from going out of the house.

When the room is to be air-conditioned, air conditioning operated by a person inside the room is different from air conditioning operated by a person from the outside of the room. Controlling the air conditioning by a person from the outside of the room is considered such a case that the temperature of the room where nobody is present is controlled to a certain temperature until the person enters the room. In other words, the purpose of controlling the device is considered the reservation of the operation, although the control itself is carried out instantly. On the other hand, there is a case where the air conditioning is controlled by the person inside the room. This case indicates that the person inside the room feels that the room temperature is not appropriate and instantly adjusts the room temperature.

The device control apparatus 41 shown in this second embodiment identifies a position at which the user has input voice, and sets a plurality of security levels corresponding to positions for the same control command. Therefore, it is possible to control the device corresponding to the situations. For example, it is possible to set the control command for unlocking of the front door such that an invader from the outside is prevented and, at the same time, persons inside the house can go out freely. Further, it is possible to limit persons who can go out, by setting an authority level. For the control of the air conditioning, even when a user having a high priority level has controlled the air conditioning from the outside of the room, a user inside the room can change the control of the air conditioning regardless of the priority level of this user.

For the operation of reserving air conditioning, the security level is set the same regardless of the input positions. When the air conditioning is reserved, even when the operation is input by a person inside the room, it is considered that the person has nothing to do with the current room temperature but a reserved temperature. As explained above, it is not always necessary to set a security level of the control command for each position, and the security level may be set according to the contents of the control command. Although the explanation has been made in the above by assuming two positions for one control command, it is also possible to set security levels in further detail corresponding to each position.

In the third embodiment, a device control apparatus and a device control method wherein the device control apparatus explained in the first embodiment and the second embodiment further has a function of controlling the operation of devices by using a reception history of control commands and information output from an external sensor will be explained.

Figure 8:
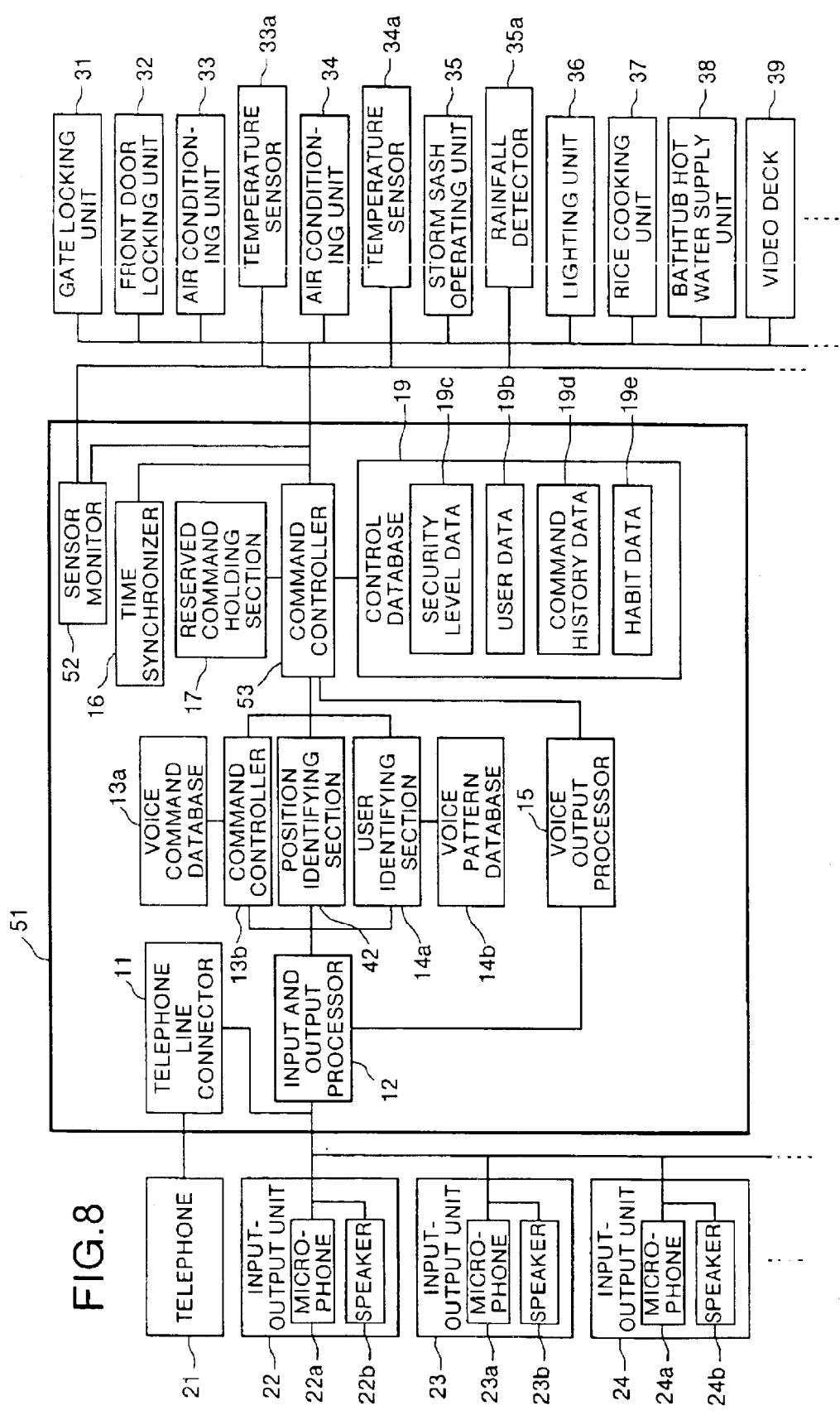
FIG. 8 is a diagram for explaining an outline structure of a device control apparatus 51 according to a third embodiment.

FIG. 8 is a diagram for explaining an outline structure of a device control apparatus 51 according to the third embodiment. In FIG. 8, the device control apparatus 51 has a sensor monitor 52. Further, the control database 19 holds a command history data 19d and a habit data 19e inside this database. A command controller 53 decides whether a received control command is allowed to be executed or not, based on a security level of the control command, an authority level and a priority level of a user, sensor information output from the sensor monitor 52, the command history data 19d, and the habit data 19e. Other structures are similar to those of the device control apparatus 1 shown in the first embodiment and the second embodiment. The same reference numerals are assigned to the identical constituent elements, and detailed explanation of the elements will be omitted.

The sensor monitor 52 is connected to temperature sensors 33a and 34a and rainfall detector 35a that are externally provided. The temperature sensor 33a is disposed in the vicinity of the air conditioning unit 33, and measures a temperature of the vicinity of the air conditioning unit 33. The temperature sensor 34a is disposed in the vicinity of the air conditioning unit 34, and measures a temperature of the vicinity of the air conditioning unit 34. Further, the rainfall detector 35a is installed outdoors, and detects whether it is raining or not. The sensor monitor 52 outputs information of temperatures and whether it is raining or not, that are output from the temperature sensors 33a and 34a and the rainfall detector 35a, to the command controller 53 as sensor information. The command controller 53 decides whether a control command is allowed to be executed or not based on the sensor information received from the sensor monitor 52, when the command controller 53 has received the control command added with a condition "Start the heater when the room temperature has become 10° C. or below" or "Close the storm sashes when it has started raining".

The command history data 19d that is held in the control database 19 records all received control commands regardless of whether they are executed or not. Further, the habit data 19e registers control commands that the user has repeatedly transmitted by specifying predetermined times, as habit commands, based on the command history data 19d. The habit commands show habitual actions of the user in the dairy life. FIG. 9 is a diagram for explaining one example of habit commands that are registered in the habit data 19e. In FIG. 9, the habit data 19e holds as habit commands, a control command that sets an air conditioner of a room 1 to 20° C. at six o'clock every day, a control command that ends the air conditioning of the room 1 at nine o'clock on weekdays, a control command that records a television broadcasting program of channel 4 on a video tape from sixteen o'clock to seventeen o'clock on weekdays, and a control command that sets the air conditioning of the room 1 to 20° C. at twenty o'clock every day. Further, the habit data 19e also holds as habit commands, a control command that starts rice cooking at twenty o'clock on weekdays and starts a rice cooking at eighteen o'clock on holidays.

The above user's habitual actions show "the user's dairy life". Even when such control commands exist as the reserved commands, it is difficult to consider that these reserved commands are requests each corresponding to situations at a particular point of time. Therefore, when a received control command contends with one of the reserved commands and this reserved command has been registered as the habit command, the command controller 53 preferentially executes the received control command. A user can set the registration of the habit command by himself or herself, and it is also possible to register a control command that has been requested to repeatedly execute by specifying "everyday" or "a predetermined day of the week". Further, when the received control commands are classified by time and by day of the week and any of the commands is executed more than a predetermined number of times, the control command may be registered as a habit command.

The processing operation of the command controller 53 will be explained with reference to FIG. 10 and FIG. 11. FIG. 10 is a flowchart which explains the processing operation of the command controller 53 based on a habit command, and FIG. 11 is a flowchart which explains the processing operation of the command controller 53 based on sensor information. In FIG. 10, the command controller 53 first receives a control command from the command controller 53, and receives data for a user who has input the control command from the user identifying section 14 (step S201). Next, the command controller 53 obtains a security level of the control command received from the control database 19, and decides whether the security level assigns a user limitation, that is, whether the security level is any one of 1 to 3 or not (step S202). When the security level assigns a user limitation, that is, when the security level is any one of 1 to 3 (Yes at step S202), the command controller 53 decides whether the authority level of the user satisfies an authority level required by the command or not (step S203). When the authority level of the user does not satisfy the required authority level of the command (No at step S203), the command controller 53 abandons the received control command (step S209), and ends the processing.

When the security level of the received control command does not assign the user limitation, that is, when the security level is 4 or 5 (No at step S202), and also when the authority level of the user satisfies the required authority level of the command (Yes at step S203), the command controller 53 refers to the reserved command holding section 17 and decides whether any reserved command that contends with the received control command exists or not (step S204). When no reserved command that contends exists (No at step S204), the command controller 53 executes the received control command (step S210), and ends the processing.

When any reserved command that contends exists (Yes at step S204), the command controller 53 decides whether the security level of the control command permits an automatic decision or not, that is, whether the security level is any one of 2 to 5 or not (step S205). When the security level of the control command does not permit an automatic decision, that is, when the security level is 1 (No at step S205), the command controller 53 abandons the received control command (step S209), and ends the processing. When the security level of the control command permits an automatic decision, that is, when the security level is any one of 2 to 5 (Yes at step S205), the command controller 53 refers to the habit data 19e, and decides whether the reserved command has been registered as a habit command or not (step S206). When the reserved command has been registered as a habit command (Yes at step S206), the command controller 53 executes the received control command (step S210), and ends the processing.

When the reserved command has not been registered as a habit command (No at step S206), the command controller 53 decides whether the received control command includes the reserved command or not (step S207). When the control command includes the reserved command, that is, when there is no contradiction between the received control command and the reserved command (Yes at step S207), the command controller 53 executes the received control command (step S210), and ends the processing. When the received control command does not include the reserved command, that is, when the received control command is contradictory with the reserved command (No at step S207), the command controller 53 decides whether the priority level of the user who has input the control command is not lower than the priority level of the reserved command or not (step S208). When the priority level of the user who has input the control command is lower than the priority level of the user who has input the reserved command (No at step S208), the command controller 53 abandons the received control command (step S209), and ends the processing. When the priority level of the user who has input the control command is not lower than the priority level of the user who has input the reserved command (Yes at step S208), the command controller 53 executes the control command (step S210), and ends the processing.

The execution of the control command by the command controller 53 (step S210) will be explained with reference to FIG. 11. For executing a control command, the command controller 53 first analyzes the control command (step S301). Next, the command controller 53 confirms whether a condition for executing the control command has been set or not (step S302). When a condition has not been set to the control command (No at step S302), the command controller 53 executes the processing of transmitting the control command to a corresponding device (step S307), and ends the processing. When a condition has been set to the control command (Yes at step S302), the command controller 53 decides whether a time has been specified in the condition or not (step S303). When a time has been specified in the condition (Yes at step S303), the command controller 53 adds the received control command to the reserved command list, and waits until the specified time comes (step S304).

After the processing at step S304, or when the time has not been specified in the condition (No at step S303), the command controller 53 decides whether any condition other than the time has been set to the received control command or not (step S305). When any condition other than the time has not been set to the control command (No at step S305), the command controller 53 executes the processing of transmitting the control command to a corresponding device (step S307), and ends the processing. When any condition other than the time has been set to the control command (Yes at step S305), the command controller 53 decides whether sensor information to satisfy the condition has been received from the sensor monitor 52 or not (step S306). When sensor information to satisfy the condition has not been received from the sensor monitor 52 (No at step S306), the command controller 53 waits until sensor information to satisfy the condition receives from the sensor monitor 52. When sensor information to satisfy the condition has been received from the sensor monitor 52 (Yes at step S306), the command controller 53 executes the processing of transmitting the control command to a corresponding device (step S307), and ends the processing.

As explained above, the actions that the user carries out by habit as habit commands, and the habit commands and the sensor information received from an externally-provided sensor are used as a decision material. These conditions allow the device control apparatus 1 to execute a flexible control such as "Turn on the heater when the temperature becomes low" and "Close the storm sashes when it has started raining". Further, when habitual actions of the user are set in a database based on the reception history of the control commands, it is possible to suitably correspond to the situations.

The habit data 19e and the command history data 19d can be used to decide a control command from the voice of the user. In the daily conversations carried out by persons, there exist expressions that can be understood in a plurality of meanings. For example, there is an expression "Heat the bath water at seven o'clock". However, it is not possible to decide based on this sentence whether the time is seven o'clock in the morning, or seven o'clock in the afternoon, that is nineteen o'clock. When conversation is carried out between persons, it is possible to correctly understand the meaning from the foregoing or subsequent context. According to the voice control by a computer, the contents are understood based on only a single sentence without using any helpful context. However, by referring to the habit data 19e and the command history data 19d, and by obtaining a confirmation when the user's conduct is different from the daily conduct, it is possible to correctly extract the user's request. Assume, in the above example, the user has input "Heat the bath water at seven o'clock", although the user has never controlled to heat the bath water in the morning. In this case, it is possible to output a message to obtain a confirmation such as "Is it OK to heat the bath water at seven o'clock in the afternoon?" based on determination that "seven o'clock" is most likely "seven o'clock in the afternoon". When the user has given an approval to this message, the control command may be reserved.

The command history data 19d is used to give an alarm when a suspicious control command has been received. For example, assume a control command to request the unlocking of the front door has been received from a person not registered as a user by a number of times in excess of a predetermined number of times. In this instance, it is possible to transmit a message "An instruction to unlock the front door has been received from an unknown person" to a user's telephone or a security company or the like. Based on this, it is possible to obtain more firm security.

As described above, according to the third embodiment, it is decided whether a control command is allowed to be executed, by using the sensor information output from the sensor monitor 52 connected to the external sensor and the habit data 19e structured based on the history of the received control commands. Therefore, it is possible to control devices more flexibly. Further, as the control command is detected from the voice of the user based on the command history data 19d and the habit data 19e, it is possible to properly decide the contents intended by the user. Further, when a control command has been received from a suspicious user, it is possible to issue an alarm based on the command history data 19d.

As explained above, in the device control apparatus and the device control method, a control command is detected and a user is identified from input voice, and execution of the control command is controlled based on a comparison between a security level set to the control command and an authority level set to the user. Therefore, it is possible to obtain the device control apparatus and the device control method capable of integrally controlling a plurality of devices and flexibly responding to a voice instruction according to situations.

Furthermore, in the device control apparatus and the device control method, a position at which the voice of the user has been input is identified, and further a security level that is different at each position to the control command is set. Based on this, it is possible to control whether the control command is allowed to be executed or not, according to the position at which the user has input the control command. Therefore, it is possible to obtain the device control apparatus and the device control method capable of integrally controlling a plurality of devices and more flexibly responding to a voice instruction according to situations.

Moreover, in the device control apparatus and the device control method, the reserved operation for executing a control command can be carried out at a time specified in advance. Therefore, it is possible to obtain the device control apparatus and the device control method capable of integrally controlling a plurality of devices, flexibly responding to a voice instruction according to situations, and reserving the control command.

Furthermore, in the device control apparatus and the device control method, execution of a control command can be automatically controlled when a plurality of users have input mutually different control commands and these control commands are contradictory. Therefore, it is possible to obtain the device control apparatus and the device control method capable of integrally controlling a plurality of devices, flexibly responding to a voice instruction according to situations, and automatically controlling execution of mutually contradictory control commands input from a plurality of users.

Moreover, in the device control apparatus and the device control method, a newly received control command an be preferentially executed when a control command reserved in advance is instructed by habit. Therefore, it is possible to obtain the device control apparatus and the device control method capable of integrally controlling a plurality of devices, flexibly responding to a voice instruction according to situations, and automatically controlling execution of mutually contradictory control commands input from a plurality of users.

Furthermore, in the device control apparatus and the device control method, a control command of which execution has been scheduled can be output according to a request from the user. Therefore, it is possible to output a list of reserved commands to the user in the device control apparatus and the device control method capable of integrally controlling a plurality of devices and flexibly responding to a voice instruction according to situations.

Moreover, in the device control apparatus and the device control method, a control command can be reserved by using a reservation function of a device when the device connected has the own reservation function. Therefore, it is possible to obtain the device control apparatus and the device control method capable of integrally controlling a plurality of devices and flexibly responding to a voice instruction according to situations and a device connected.

Furthermore, in the device control apparatus and the device control method, the time of the clock functions of connected devices is synchronized. Based on this, it is possible to avoid deviations in the time between the devices and control the plurality of devices by linking them to each other. Therefore, it is possible to operate the plurality of devices linked to each other in the device control apparatus and the device control method capable of integrally controlling a plurality of devices and flexibly responding to a voice instruction according to situations.

Moreover, in the device control apparatus and the device control method, execution of a control command is decided based on the information output from the external sensor. Based on this, it is possible to set the control command by attaching an optional condition to the control command. Therefore, it is possible to obtain the device control apparatus and the device control method capable of integrally controlling a plurality of devices and flexibly responding to a voice instruction according to situations.

Furthermore, in the device control apparatus and the device control method, an alarm can be issued to a predetermined notification destination based on a reception history of the control command. Therefore, it is possible to obtain the device control apparatus and the device control method capable of integrally controlling a plurality of devices and flexibly responding to a voice instruction according to situations, and having firm security.

Moreover, in the device control apparatus and the device control method, voice of the user is received via the telephone line and the device is controlled by this voice. Based on this, it is possible to operate the device by remote control. Therefore, it is possible to obtain the device control apparatus and the device control method capable of integrally controlling a plurality of devices and flexibly responding to a voice instruction according to situations, and carrying out a remote control operation by telephone.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device control method of controlling operation of a device based on a control command extracted from voice of a user, the device control method comprising:
    storing in advance a plurality of user identifiers and authority level of each user in correlated form;
    storing in advance a plurality of control commands and security level of each control command in correlated form;
    identifying the user and the control command based on voice of the user;
    determining an authority level of the identified user based on the stored data;
    determining an security level of the identified control command based on the stored data;
    controlling transmission of the control command to the device based on a comparison between the determined authority level and the control command; and
    outputting time information to a clock function incorporated in each of the plurality of devices, and synchronizing the time of the clock functions incorporated in the plurality of devices.

2. A device control apparatus that controls operation of a device based on a control command extracted from voice of a user, the device control apparatus comprising:
    an authority level storing unit that stores a plurality of user identifiers and authority level of each user in correlated form;
    a security level storing unit that stores a plurality of control commands and security level of each control command in correlated form;
    a user and command identifying unit that identifies the user and the control command from the voice of the user;
    a command controller that controls transmission of the control command to the device based on a comparison between the authority level of the identified user and the security level of the identified control command; and
    an input position identifying unit that identifies a position at which the voice has been input, wherein the security level storing unit stores a plurality of security levels for the same control command corresponding to positions at which the voice has been input.

3. A device control apparatus that controls operation of a device based on a control command extracted from voice of a user, the device control apparatus comprising:
    an authority level storing unit that stores a plurality of user identifiers and authority level of each user in correlated form;
    a security level storing unit that stores a plurality of control commands and security level of each control command in correlated form;
    a user and command identifying unit that identifies the user and the control command from the voice of the user;
    a command controller that controls transmission of the control command to the device based on a comparison between the authority level of the identified user and the security level of the identified control command; and
    a reserved command holding unit that holds the control command as a reserved command until a specified time comes, when a time condition to specify the time at which the control command is executed has been added to the control command.

4. A device control apparatus that controls operation of a device based on a control command extracted from voice of a user, the device control apparatus comprising:
   an authority level storing unit that stores a plurality of user identifiers and authority level of each user in correlated form;
   a security level storing unit that stores a plurality of control commands and security level of each control command in correlated form;
   a user and command identifying unit that identifies the user and the control command from the voice of the user;
   a command controller that controls transmission of the control command to the device based on a comparison between the authority level of the identified user and the security level of the identified control command; and
   a priority level storing unit that stores a plurality of priority levels and a plurality of users in correlated form where a priority order for each user is determined, wherein when a received control command contends with a control command in execution or with the reserved command, the command controller preferentially transmits the control command input by a user who has a higher priority level.

5. A device control apparatus that controls operation of a device based on a control command extracted from voice of a user, the device control apparatus comprising:
   and authority level storing unit that stores a plurality of user identifiers and authority level of each user in correlated form;
   a security level storing unit that stores a plurality of control commands and security level of each control command in correlated form;
   a user and command identifying unit that identifies the user and the control command from the voice of the user;
   a command controller that controls transmission of the control command to the device based on a comparison between the authority level of the identified user and the security level of the identified control command; and
   a habit control command holding unit that holds as a habit command a control command that is repeatedly received at a specified time based on a reception history of the control command, wherein when a received control command contends with a control command in execution or with the reserved command and the contending command is the habit command, the command controller preferentially executes the received control command.

6. The device control apparatus according to claim 3, wherein when a request to make confirmation of the reserved command has been received, the command controller outputs a list of the reserved command.

7. The device control apparatus according to claim 3, wherein when a control command with a time specified has been received and a device as a transmission destination of the control command has an own reservation function, the command controller controls the operation of the device using the reservation function.

8. A device control apparatus that controls operation of a device based on a control command extracted from voice of a user, the device control apparatus comprising:
   an authority level storing unit that stores a plurality of user identifiers and authority level of each user in correlated form;
   a security level storing unit that stores a plurality of control commands and security level of each control command in correlated form;
   a user and command identifying unit that identifies the user and the control command from the voice of the user;
   a command controller that controls transmission of the control command to the device based on a comparison between the authority level of the identified user and the security level of the identified control command; and
   a time synchronizing unit that outputs time information to a clock function incorporated in each of the plurality of devices, and synchronizes the time of the clock functions incorporated in the plurality of devices.

9. A device control apparatus that controls operation of a device based on a controls commands extracted from voice of a user, the device control apparatus comprising:
   an authority level storing unit that stores a plurality of user identifiers and authority level of each user in correlated form;
   a security level storing unit that stores a plurality of control commands and security level of each control command in correlated form;
   a user and command identifying unit that identifies the user and the control command from the voice of the user;
   a command controller that controls transmission of the control command to the device based on a comparison between the authority level of the identified user and the security level of the identified control command; and
   a sensor monitoring unit that is connected to an external sensor and that receives information output from the external sensor, wherein when a condition required for execution of the control command has been added to the control command, the command controller controls transmission of the control command based on the information output from the external sensor.

10. A device control apparatus that controls operation of a device based on a control command extracted from voice of a user, the device control apparatus comprising:
    an authority level storing unit that stores a plurality of user identifiers and authority level of each user in correlated form;
    a security level storing unit that stores a plurality of control commands and security level of each control command in correlated form;
    a user and command identifying unit that identifies the user and the control command from the voice of the user;
    a command controller that controls transmission of the control command to the device based on a comparison between the authority level of the identified user and the security level of the identified control command; and
    an alarming unit that issues an alarm based on a reception history of the control command.

11. A device control method of controlling operation of a device based on a control command extracted from voice of a user, the device control method comprising:
    storing in advance a plurality of user identifiers and authority level of each user in correlated form;

storing in advance a plurality of control commands and security level of each control command in correlated form;

identifying the user and the control command based on voice of the user;

determining an authority level of the identified user based on the stored data;

determining an security level of the identified control command based on the stored data;

controlling transmission of the control command to the device based on a comparison between the determined authority level and the control command; and receiving information output from a sensor provided externally, wherein when a condition required for executing the control command has been added to the control command, transmission of the control command is controlled at the command control step based on the information output from the external sensor.

12. A device control method of controlling operation of a device based on a control command extracted from voice of a user, the device control method comprising:

storing in advance a plurality of user identifiers and authority level of each user in correlated form;

storing in advance a plurality of control commands and security level of each control command in correlated form;

identifying the user and the control command based on voice of the user;

determining an authority level of the identified user based on the stored data;

determining an security level of the identified control command based on the stored data;

controlling transmission of the control command to the device based on a comparison between the determined authority level and the control command; and issuing an alarm based on a reception history of the control command.

13. A device control method of controlling operation of a device based on a control command extracted from voice of a user, the device control method comprising:

storing in advance a plurality of user identifiers and authority level of each user in correlated form;

storing in advance a plurality of control commands and security level of each control command in correlated form;

identifying the user and the control command based on voice of the user;

determining an authority level of the identified user based on the stored data;

determining an security level of the identified control command based on the stored data;

controlling transmission of the control command to the device based on a comparison between the determined authority level and the control command; and identifying a position at which the voice has been input, wherein at the security level outputting step, a security level corresponding to a position at which the voice has been input is output to the control command.

14. A device control method of controlling operation of a device based on a control command extracted from voice of a user, the device control method comprising:

storing in advance a plurality of user identifiers and authority level of each user in correlated form;

storing in advance a plurality of control commands and security level of each control command in correlated form;

identifying the user and the control command based on voice of the user;

determining an authority level of the identified user based on the stored data;

determining an security level of the identified control command based on the stored data;

controlling transmission of the control command to the device based on a comparison between the determined authority level and the control command; and holding the control command as a reserved command until a specified time comes, when a time condition to specify the time at which the control command is executed has been added to the control command.

15. A device control method of controlling operation of a device based on a control command extracted from voice of a user, the device control method comprising:

storing in advance a plurality of user identifiers and authority level of each user in correlated form;

storing in advance a plurality of control commands and security level of each control command in correlated form;

identifying the user and the control command based on voice of the user;

determining an authority level of the identified user based on the stored data;

determining an security level of the identified control command based on the stored data;

controlling transmission of the control command to the device based on a comparison between the determined authority level and the control command; and storing a plurality of priority levels and a plurality of users in correlated form, wherein when a received control command contends with a control command in execution or with the reserved command, the control command input by a user who has a higher priority level is preferentially transmitted at the command control step.

16. A device control of a device based on a control command extracted from voice of a user, the device control method comprising:

storing in advance a plurality of user identifiers and authority level of each user in correlated form;

storing in advance a plurality of control commands and security level of each control command in correlated form;

identifying the user and the control command based on voice of the user;

determining an authority level of the identified user based on the stored data;

determining an security level of the identified control command based on the stored data;

controlling transmission of the control command to the device based on a comparison between the determined authority level and the control command; and storing a control command, as a habit command, that is repeatedly received at a specified time based on a reception history of the control command, wherein when a received control command contends with a control command in execution or with the reserved command and the contending command is the habit command, the received control command is preferentially executed at the command control step.

17. The device control method according to claim 14, further comprising outputting a list of the reserved commands when a request to make confirmation of the reserved command has been received.

18. The device control method according to claim 14, wherein when a control command with a time specified has been received and a device as a transmission destination of the control command has an own reservation function, the operation of the device is controlled at the command control step by using the reservation function.

* * * * *

UNITED STATES PATENT AND TRADEMARK OFFICE
CERTIFICATE OF CORRECTION

PATENT NO. : 6,842,510 B2
DATED : January 11, 2005
INVENTOR(S) : Mariko Sakamoto It is certified that error appears in the above-identified patent and that said Letters Patent is hereby corrected as shown below:

<u>Title page,</u>
Item [56], References Cited, U.S. PATENT DOCUMENTS, please insert
-- 6,535,854 3/2003 Buchner et al.
   5,777,571 7/1998 Chuang
   6,119,088 9/2000 Ciluffo --

<u>Column 17,</u>
Line 31, change "and" to -- an --.

<u>Column 18,</u>
Line 20, change "controls commands" to -- control command --.

<u>Column 21,</u>
Line 2, insert a space between "14," and "further".

Signed and Sealed this

Twenty-eighth Day of June, 2005

JON W. DUDAS
*Director of the United States Patent and Trademark Office*